(12) United States Patent
Catheline

(10) Patent No.: US 8,602,638 B2
(45) Date of Patent: Dec. 10, 2013

(54) BRACELET WITH ARTICULATED LINKS AND USE OF THIS BRACELET

(75) Inventor: Adrien Catheline, Valleiry (FR)

(73) Assignee: Rolex S.A., Geneva (CH)

( * ) Notice: Subject to any disclaimer, the term of this patent is extended or adjusted under 35 U.S.C. 154(b) by 104 days.

(21) Appl. No.: 13/300,037

(22) Filed: Nov. 18, 2011

(65) Prior Publication Data

US 2012/0144862 A1    Jun. 14, 2012

(30) Foreign Application Priority Data

Dec. 8, 2010  (EP) .................................... 10405233
Dec. 22, 2010  (EP) .................................... 10405244

(51) Int. Cl.
  *A44C 5/02*  (2006.01)
(52) U.S. Cl.
  USPC .......................................... 368/282; 224/164
(58) Field of Classification Search
  USPC ........................... 368/282; 224/164–179; 63/9
  See application file for complete search history.

(56) References Cited

U.S. PATENT DOCUMENTS

| 2002/0009019 | A1* | 1/2002 | Gunster et al. | ................ 368/282 |
| 2002/0020726 | A1* | 2/2002 | Gunster et al. | ................ 224/179 |
| 2004/0184358 | A1* | 9/2004 | Hiranuma et al. | ............ 368/282 |
| 2007/0104035 | A1* | 5/2007 | So et al. | ........................ 368/282 |
| 2009/0113870 | A1 | 5/2009 | Rejzner | |

FOREIGN PATENT DOCUMENTS

| EP | 0165206 A1 | 12/1985 |
| EP | 0243315 A1 | 10/1987 |
| EP | 0749709 A1 | 12/1996 |
| EP | 1018308 A1 | 7/2000 |
| EP | 2057914 A1 | 5/2009 |
| FR | 1595305 A | 6/1970 |

OTHER PUBLICATIONS

European Search Report (ESR) of EP 10405233, mailing date Apr. 12, 2011.

* cited by examiner

*Primary Examiner* — Amy Cohen Johnson
*Assistant Examiner* — Matthew Powell
(74) *Attorney, Agent, or Firm* — Westerman, Hattori, Daniels & Adrian, LLP

(57) ABSTRACT

This bracelet comprises a plurality of articulated elements (1) in which one transverse edge of each element is interlocked in a transverse edge of an adjacent element, a transverse passageway passing at least partially through the adjacent interlocked portions in order to form a bearing (7) in which an articulation member (10) is engaged and is held at least one end of the said transverse passageway. The mid-portion of the said articulation member (10) comprises at least one O-ring placed on the portion of the said articulation member (10) situated inside the said bearing (7) and close to its ends and in jointed contact with the wall of the said transverse passageway.

20 Claims, 5 Drawing Sheets

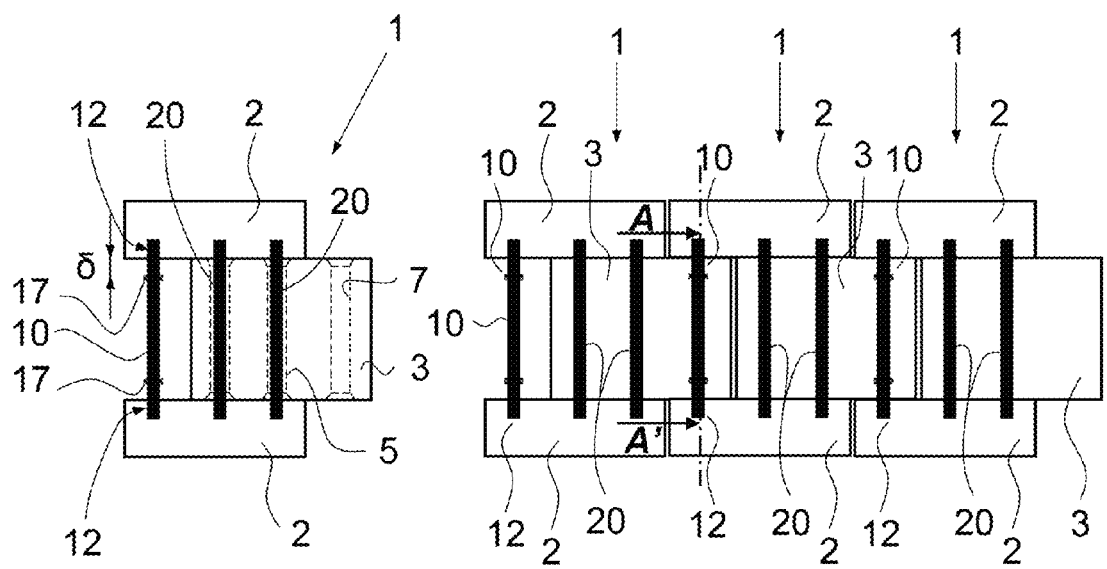
Fig. 1  Fig. 1'
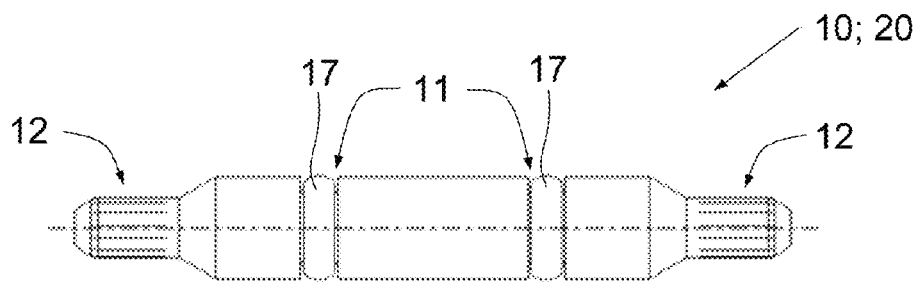
Fig. 2a
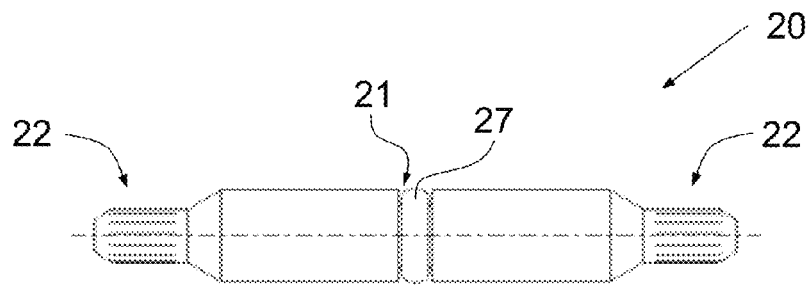
Fig. 2b

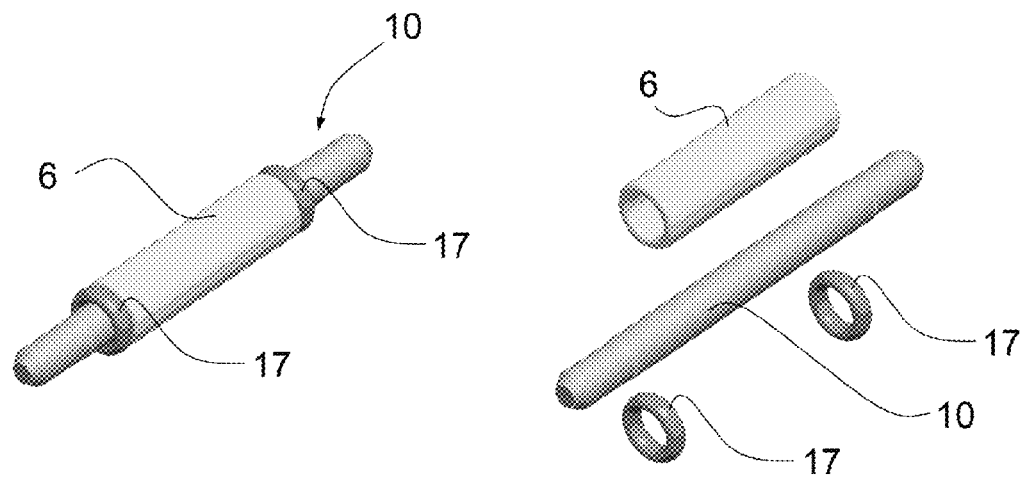
Fig. 5          Fig. 5'
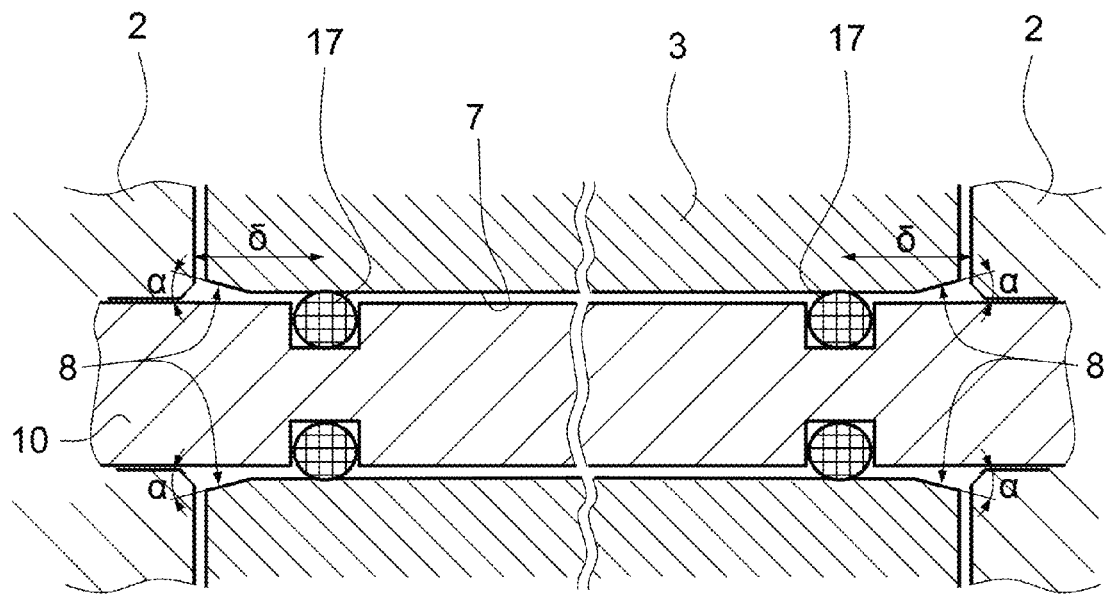
Fig. 6

BRACELET WITH ARTICULATED LINKS AND USE OF THIS BRACELET

BACKGROUND ART

The present invention relates to a bracelet comprising a plurality of articulated elements in which the two transverse edges of an element are interlocked in the transverse edges of respective adjacent elements, transverse passageways passing at least partially through the respective adjacent interlocked portions in order to form bearings in which articulation members are engaged and are held at the two ends of the said respective transverse passageways. This invention also relates to a use of this bracelet.

The arrangement of annular seals of the O-ring type on articulation members such as shafts connecting the links of a bracelet, in particular a watch bracelet, is known as attested by EP 0 165 206. However, in this document, the annular seals do not participate in the articulation but only in the attachment of articulation pins to the assembled links which are articulated with one another by these pins which are used both as members for the connection and articulation of the links. The object of this document is to produce a simple, reliable and low-cost assembly. Production does not therefore have to demand high precision, the installation and the removal must be easy and the hold of each pin must be reliable despite the movements, impacts and vibrations to which the bracelet may be subjected. To satisfy this specification, the pins have a groove in which a seal (such as for example an O-ring) is housed close to each of their ends situated inside the edge links.

FR 1 595 305 also proposes the use of O-rings on pegs designed to be inserted into bores. According to this document, it is advisable to be able to easily insert the peg into the bore while its extraction from the bore must be made difficult. Accordingly, the end portion of the peg comprises a groove having an inclined wedging surface against which an O-ring rests. The inclined wedging surface is oriented so that, when the peg is assembled into the bore, the O-ring is pushed to the bottom of the groove. In this manner, the insertion of the peg into its bore is easy while removing it is prevented by the inclined surface which compresses the seal between the peg and the bore.

One of the persistent problems in the devices described above, as in all the bracelets of this kind known hitherto, lies in the fact that the articulation pins wear over time. This wear is caused by the friction in the presence of abrasive and/or corrosive substances, such as sweat or sea water, which penetrate between the friction surfaces of the articulations and which progressively eat away at the articulation pins and the surfaces of the bearings. This wear causes looseness in the articulations and this looseness in its turn causes wear of the links.

To remedy this problem, EP 0 243 315 proposes interposing ruby bearings between the links and the articulation shafts. EP 2 057 914 suggests another solution which consists in allowing friction only between materials identified for their compatibility with rubbing against one another with a minimum of wear.

A further drawback associated with the bracelets formed of articulated elements lies in the fact that the small inter-surface impacts allowed by the looseness between these elements causes undesirable clicking.

SUMMARY OF THE INVENTION

The object of the present invention is to remedy at least in part the aforementioned drawbacks.

Accordingly, the first subject of the invention is a bracelet comprising a plurality of articulated elements in which the transverse edges of an articulated element are interlocked in the transverse edges of respective adjacent elements, transverse passageways passing at least partially through the respective adjacent interlocked portions in order to form bearings in which articulation members are engaged and are held at least one end of the said respective transverse passageways, characterized in that at least one annular seal surrounds the mid-portion of at least one articulation member situated inside the corresponding bearing and is in jointed contact with the wall of one of the said transverse passageways. A further subject of the invention is a use of this bracelet as a watch bracelet, in which at least one of the said transverse edges interlocked in a transverse edge of the said articulated elements is arranged in a bracelet clasp element and/or in a watch case in order to make it possible to connect the said clasp and/or the said case to one of the said articulated elements of the bracelet.

The annular seal makes it possible to reduce the friction between the articulation member and the bearing. It also makes it possible to reduce the movements of the articulated elements allowed by the looseness and thus to reduce the wear as well as the noises resulting from the impacts between the articulated elements. Specifically, since these seals are in jointed contact with the wall of the bearing, they cause a slippery friction which makes it possible to reduce, or even remove, the looseness in the articulations of the bracelet thus producing a sensation which substantially improves the perception of quality given by such a bracelet.

Advantageously, at least two annular seals interact with the wall of the bearing in order to arrange between them a sealed space which reserves a space preventing the intrusion of abrasive and/or corrosive substances into the bearing, and does so even when there is considerable outside pressure such as during a deep dive.

Preferably, the annular seals are placed in grooves arranged in the articulation member.

Each groove arranged on the articulation shaft may have a bevel the angle of which is adapted so that the annular seal is squashed and ensures resistance to pressure.

The seals may also be placed in housings provided in the bearing, for example in the form of a facing made on either side of the passageway.

The wear between these friction surfaces is thereby reduced and the service life of these parts extended.

Advantageously, such seals are also installed in the same manner on one or more connecting members, for example on two parallel connecting rods supporting an intermediate link between two edge links. As in the case of the articulation, the arrangement of a single seal, preferably in the mid-portion of one or more of these rods, may be sufficient to remove all looseness and therefore any impact between these links and thus contribute to the noise reduction and to the sensation of quality given by the bracelet.

BRIEF DESCRIPTION OF THE DRAWINGS

Other advantages and specific features will appear in the light of the detailed description that follows and that presents one embodiment and variants of the invention illustrated schematically and as an example by the appended figures in which:

FIG. 1 is a plan view of an articulated element according to a first embodiment of the invention.

FIG. 1' is a plan view representing the assembly of three articulated elements of FIG. 1.

FIG. 2a represents an articulation or connecting member provided with O-rings placed according to the invention.

FIG. 2b represents a connecting member provided with a middle O-ring.

FIG. 4 is a view in perspective of a variant of the articulation member illustrated in FIG. 2a.

FIGS. 5 and 5' represent views in perspective of the assembled, respectively separated, elements forming a variant of the member illustrated in FIG. 2a.

FIG. 6 is a view in cross section along the line A-A of FIG. 1'.

DETAILED DESCRIPTION OF PARTICULAR EMBODIMENTS

Figure 3A:
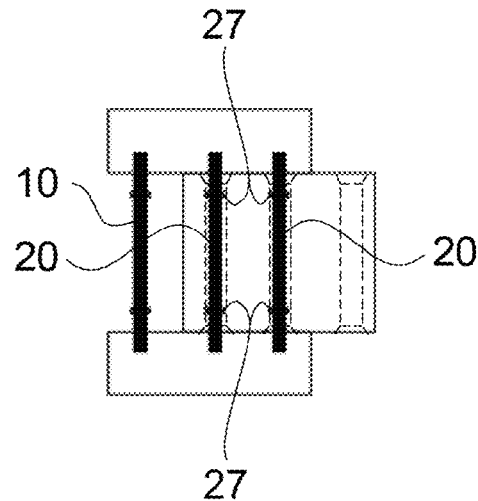
FIGS. 3a and 3b represent two other embodiments of the invention in illustrations similar to that of FIG. 1.

FIG. 1 represents an articulated element 1 comprising two edge links 2 and one intermediate link 3. The latter is connected to the edge links 2 by at least one connecting member 20, in this instance two parallel connecting members which are held by the edge links and each traverse a passageway 5 arranged in the intermediate link 3.

The assembly of a plurality of articulated elements 1 to form a bracelet is illustrated in FIG. 1' in which each articulated element 1 is connected to the adjacent articulated element by an articulation member 10. The latter is held at its ends 12 in housings arranged in the edge links 2. Its mid-portion traverses a bearing 7 arranged in the intermediate link 3 of the adjacent articulated element 1.

As illustrated in FIG. 2a, the articulation member 10 comprises, in this example, two grooves 11 each receiving an annular seal 17, typically an O-ring. These seals 17 are placed in the mid-portion of the articulation member situated inside the bearing 7 and close to the edge links 2 and are in jointed contact with the wall of the bearing 7 in order to arrange a sealed space between them. According to a variant not shown but similar to FIG. 2b, only one annular seal could be used in order to reduce the looseness between the articulated elements, and the friction between the bearing 7 and the articulation member 10.

FIG. 2b represents in greater detail the connecting member 20 which takes the form of a rod housed in the passageway 5 arranged in the intermediate link 3. The latter is then held between the two edge links 2, in housings arranged in the latter. The ends 22 of the connecting member 20 are fixed in these housings, notably by chasing. As shown in this figure, this member may comprise at least one groove 21 receiving an annular seal 27 which is designed to interact with the wall of the passageway 5 arranged in the intermediate link. Advantageously, this variant makes it possible to obtain a bracelet in which the noises resulting from the impacts between the links and the other components of the bracelet are totally suppressed. When the connecting member 20 comprises only one seal 27, the latter will preferably be placed in the mid-portion of the rod that constitutes this member.

Preferably, the grooves 11 and 21 will be identical as will the seals 17, 27. As a variant, the connecting member 20 may also comprise two grooves and two O-rings as shown in FIG. 2a.

Figure 3B:
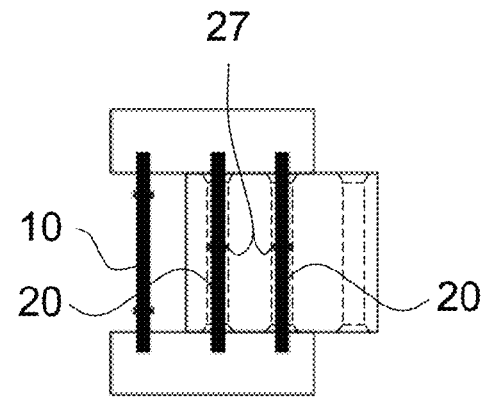

FIGS. 3a and 3b show two variants of the embodiment illustrated in FIG. 1, in which each connecting member 20 comprises two O-rings, respectively only one O-ring in its mid-portion.

Advantageously, the configuration according to FIG. 1 makes it possible to use connecting members of known types and therefore requires no modification of the latter. The configuration illustrated in FIG. 3a shows that the articulation members 10 and the connecting members 20 of the bracelet may be identical, which simplifies the production of the bracelet and prevents any possible confusion between these two members. The configurations of FIGS. 3a and 3b in both cases make it possible to remove any clicking of the bracelet which results in a perceived improvement in the quality of the bracelet.

Figure 4:
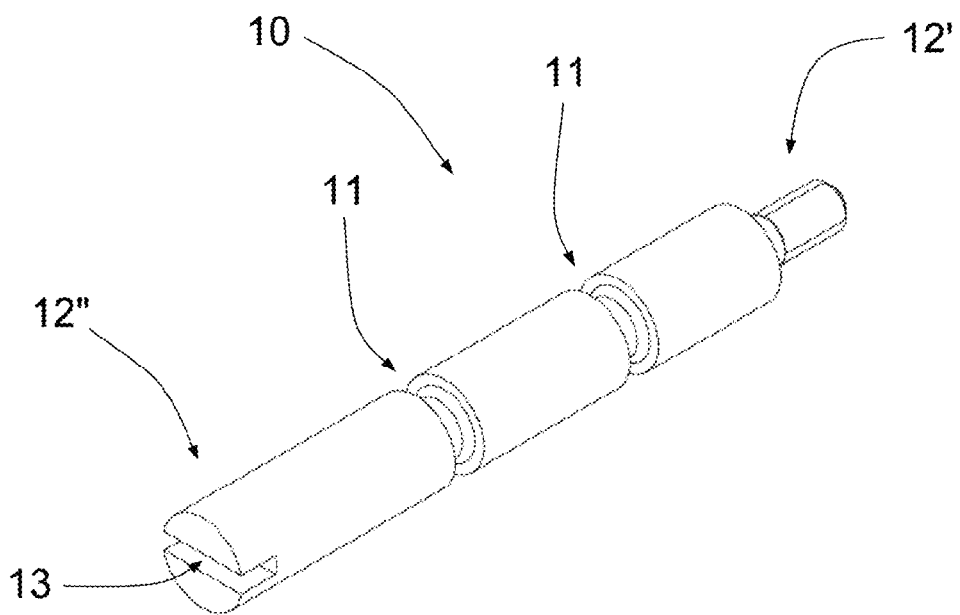

As a variant, FIG. 4 shows an articulation member 10, without the seals 17, of which one of the ends 12' is threaded while its opposite end 12" is furnished with a slot 13 for a screwdriver. The threaded end 12' of the articulation member is screwed into a tapping arranged in the housing of the corresponding edge link. Thus, this articulation member makes it possible to adjust the length of the bracelet by adding or removing one or more articulated elements 1 furnished with such an articulation member.

In another embodiment, provision is made to place a fitted bearing element 6 inside the intermediate link 3. FIG. 5 shows an example of this bearing element 6 mounted on the articulation member 10. Such a bearing element may consist of a ceramic tube that is sintered or made of composite material formed of a mixture of ceramic and a metal or else a polymer (thermoplastic for example). The material of this element must above all make it possible to further reduce the wear by friction, according to the disclosure of patent application EP 2 057 914. FIG. 5' shows separately the various elements of FIG. 5, namely the articulation member 10, the tubular bearing element 6 and the two seals 17 which rest against the lateral sides of the tube 6. Therefore, this tube is advantageously immobilized in the axial direction of the articulation member. In this case, the existence of a groove in the articulation member 10 is no longer essential, although this groove may be retained.

FIG. 6 is a view in cross section along the line A-A of FIG. 1'. According to a variant of the invention, provision is made for at least one of the edges of the bearing 7 to be provided with a bevel 8 the angle $\alpha$ of which is between 10° and 30°, preferably equal to 15°. The value of this angle as well as the length of this bevel is determined so that the seals can be inserted more easily and without damaging the bearing of the intermediate link during the assembly of the articulation member with the latter. When the member is inserted into its bearing, it is important for the squashing of the seal to be progressive so as not to damage it and to help it to remain in its groove.

As illustrated in FIGS. 1 and 6, the seals 17 are placed inside the intermediate link 3, at a distance $\delta$ from the respective edge links 2, more precisely from the inner sides of these links. Consequently, the annular seals are set back from the sides of the intermediate link so as to be able to maintain a perfect seal of the space situated between two seals of one and the same member, even after lateral wear of the intermediate link. Typically, a distance $\delta$ of the order of 1 to 2 mm is sufficiently set back to ensure this seal for a long period even during intensive use.

Although described with reference to an articulation member 10, it will be noted that the features illustrated in FIG. 6 could also apply to a connecting member 20 in the passageway 5 of the intermediate link 3.

The dimension of the grooves 11, 21 depends directly on the diameter of the section of the corresponding seals. The shape of these grooves, shown in square or rectangular section in FIG. 6, could however have a different section such as that of a groove with a rounded bottom or with inclined sides. In all cases, it is important to apply a compression to the inner and outer diameters of the seal so as to be able to ensure the effectiveness of its primary function. Thus, the compression of the seal will for example be of the order of 15-40% and may be as much as 50% without harming the seal. The lengthening of the perimeter of the seal will be typically of the order of 20% and may reach values that are markedly higher in order to have the seal pass around the body of the shaft.

The maximum lengthening of the perimeter of the seal during mounting is controlled in order to prevent too great a deformation during assembly. The compression of the seal is also controlled so as to ensure the seal.

Several materials may be used for the O-rings, such as for example the fluoroelastomers for their good resistance to chemical agents, the polybutadienes for good tenacity and the polyurethanes for their good friction resistance. The fluoroelastomers of the FKM type, bearing the commercial name Viton®, have been found to be particularly suitable. Moreover, they can be coated with a layer of a polymer of the PTFE type.

The articulation or connecting members are usually made of a metal alloy, for example of a cobalt-based alloy such as Nivaflex® or Phynox®, or else of steel such as 316 steel. They can be coated with a thin layer of amorphous carbon (DLC layer).

The intermediate links may be made of steel, for example of 904L steel, of gold or of gold alloy, of platinum, of titanium or of ceramic.

Accelerated aging tests carried out in severe conditions have shown that the wear of the bracelet is significantly reduced. This reduction is of the order of 50% to 85% depending on the materials used. Moreover, no breakage of an articulation or connecting member occurred during these tests. As a comparison, such a breakage occurs on half of the standard bracelets subjected to such a severe aging test. After these tests, the seal is still provided and the sensation of quality at the articulation still present.

The presence of the seals on the articulation members makes it possible to prevent the insertion of any abrasive particle or of any corrosive substance, which makes it possible to obtain a spectacular reduction in the wear of the articulation. The presence of seals on the attachment members, namely the members situated between the horns of the middle or case of a watch, for its part reduces the noise generated by the parts normally in direct contact in this location.

Finally, it will be understood that each articulated element 1 is in no way limited to a single intermediate link 3 but that several of these links could be placed side by side between the edge links of each articulated element 1.

The production of a sealed zone between the O-rings also makes it possible to add a lubricant in this sealed zone and to increase the longevity of the articulation.

Figure 7:
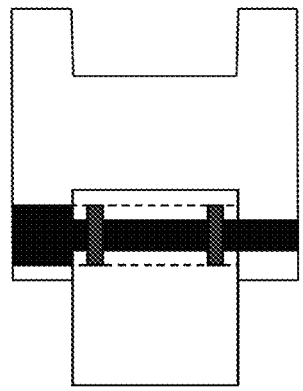
FIG. 7 is a partial plan view of a variant in which the articulated elements of the bracelet are one-piece elements.

The variant of FIG. 7 shows a variant of the bracelet of FIGS. 1 and 1', in which the articulated elements 1 are formed of one-piece elements instead of separate links.

Figure 8:
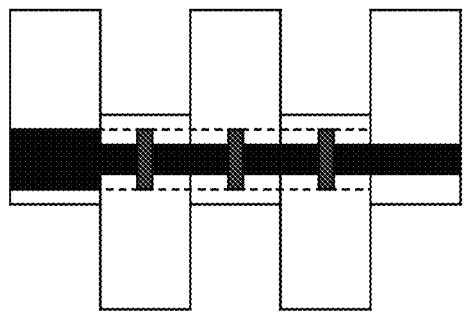
FIG. 8 is a partial plan view of another variant, in which the bracelet comprises five articulated elements in the width of the bracelet.

FIG. 8 illustrates another variant in which the articulated elements 1 are formed of separate links connected by the articulation member of which both ends are fixed in the two edge links.

Figure 9:
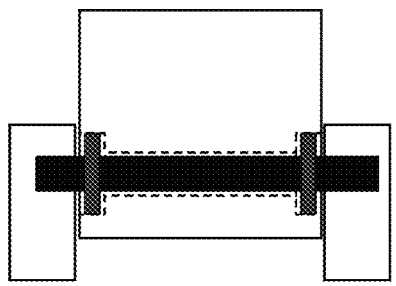
FIG. 9 is a partial plan view of another variant relating to the arrangement of the seals.

FIG. 9 illustrates another variant in which the seals are housed in housings provided in the bearing, such as for example facings made on either side of the passageway. This configuration also makes it possible to ensure the seal, by radial and/or lateral squashing of the seals depending on the dimensions of the housing.

It will also be understood that the articulated element 1 is not necessarily a link, but may also be a clasp strip, a safety element or a clasp cover, an attachment element or an element secured to the case of the watch.

Figure 10:
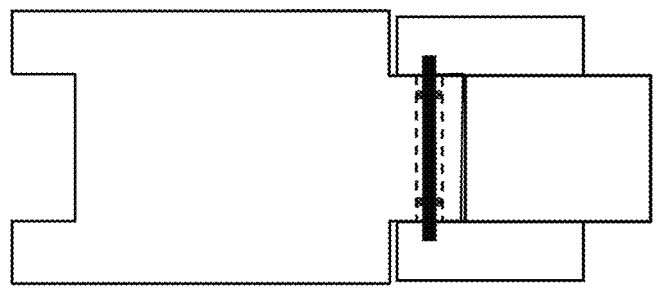
FIG. 10 illustrates a plan view of the connection between one end of the bracelet and a clasp element.

FIG. 10 illustrates a use of the bracelet with a clasp, notably a clasp of the opening buckle type, frequently used with bracelets for watches. In this variant, a transverse edge of an element of the clasp is formed to allow it to be interlocked with an edge of an articulated element 1 of the end of the bracelet.

Figure 11:
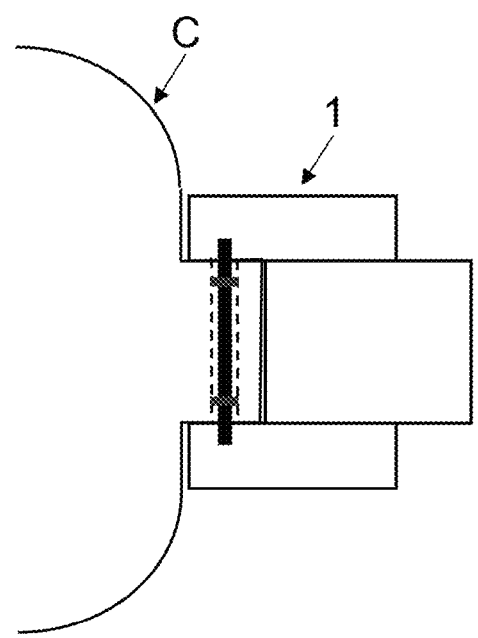
FIG. 11 illustrates a plan view of the connection between another end of the bracelet and a watch case.

FIG. 11 illustrates the connection of this same bracelet in which a transverse edge of the articulated element of another end is interlocked on a portion of the case C, formed to allow this portion to be interlocked with the transverse edge of this end of the bracelet.

Although the seals 17 and 27 described and shown are O-rings, it is specified that any annular seal with a section other than circular may be used in the context of the present invention.

The invention claimed is:

1. Bracelet comprising:
 a plurality of articulated elements, wherein respective transverse edges of adjacent articulated elements are interlocked in each other so as to form respective adjacent interlocked portions,
 a respective transverse passageway passing at least partially through the respective adjacent interlocked portions in order to form a respective bearing,
 a respective articulation member, wherein (i) the respective articulation member is engaged in and is held in a respective first of the respective adjacent elements at at least one end of the respective transverse passageway, and (ii) a respective mid-portion of the respective articulation member is rotatable with respect to a mid-portion of the respective passageway situated on a respective second of the adjacent elements, so as to form the respective bearing, and
 at least one annular seal which surrounds the mid-portion of at least one of the articulation members,
 so that the at least one annular seal is situated inside the respective bearing and is in jointed contact with a wall of the respective mid-portion of the respective transverse passageway.

2. Bracelet according to claim 1, in which at least two annular seals are placed on the portion of each of the said articulation members situated inside one of the said bearings in order to arrange sealed spaces between the said seals.

3. Bracelet according to claim 2, in which the annular seals are placed close to the respective ends of the said bearings.

4. Bracelet according to claim 3, in which the articulation members each comprise at least one groove for each to receive at least one annular seal.

5. Bracelet according to claim 4, in which at least one of the articulated elements comprises two edge links and at least one intermediate link.

6. Bracelet according to claim 3, in which at least one of the articulated elements comprises two edge links and at least one intermediate link.

7. Bracelet according to claim 2, in which the articulation members each comprise at least one groove for each to receive at least one annular seal.

8. Bracelet according to claim 7, in which at least one of the articulated elements comprises two edge links and at least one intermediate link.

9. Bracelet according to claim 2, in which at least one of the articulated elements comprises two edge links and at least one intermediate link.

10. Bracelet according to claim 9, in which at least one connecting rod is held by the edge links and traverses at least one passageway arranged in the intermediate link.

11. Bracelet according to claim 10, in which the connecting rods each comprise at least one groove each receiving an annular seal which interacts with the wall of the passageway.

12. Bracelet according to claim 1, in which the articulation members each comprise at least one groove for each to receive at least one annular seal.

13. Bracelet according to claim 12, in which at least one of the articulated elements comprises two edge links and at least one intermediate link.

14. Bracelet according to claim 1, in which at least one of the articulated elements comprises two edge links and at least one intermediate link.

15. Bracelet according to claim 14, in which at least one connecting rod is held by the edge links and traverses at least one passageway arranged in the intermediate link.

16. Bracelet according to claim 15, in which the connecting rods each comprise at least one groove each receiving an annular seal which interacts with the wall of the passageway.

17. Bracelet according to claim 16, in which the annular seal is placed in the mid-portion of the connecting rods.

18. Bracelet according to claim 15, in which the connecting rods each comprise two grooves and the annular seals arranged in the latter are placed close to the edge links and are in contact with the wall of the passageway.

19. Bracelet according to claim 1, in which at least one bearing comprises a fitted tubular bearing element.

20. Watch comprising a bracelet according to claim 1, in which at least one of the transverse edges interlocked in a transverse edge of the articulated elements is arranged in a bracelet clasp element and/or in a watch case and connects the clasp and/or the case to one of the articulated elements of the bracelet.

* * * * *